United States Patent [19]

Siwiak

[11] Patent Number: 5,640,166
[45] Date of Patent: Jun. 17, 1997

[54] METHOD FOR COMPENSATING FOR DOPPLER FREQUENCY SHIFTS FOR SATELLITE COMMUNICATION SYSTEMS

[75] Inventor: Kazimierz Siwiak, Coral Springs, Fla.

[73] Assignee: Motorola, Inc., Schaumburg, Ill.

[21] Appl. No.: 706,881

[22] Filed: Sep. 3, 1996

[51] Int. Cl.⁶ .................................................. H04B 7/185
[52] U.S. Cl. ........................... 342/354; 342/352; 342/353;
                                                                 455/12.1; 455/13.1
[58] Field of Search .................................. 342/352, 353,
                                                              342/354; 455/12.1, 13.1

[56] References Cited

U.S. PATENT DOCUMENTS

| | | |
|---|---|---|
| 3,757,334 | 9/1973 | Raabe . |
| 3,982,075 | 9/1976 | Jefferis et al. . |
| 4,188,578 | 2/1980 | Reudink et al. . |
| 4,628,506 | 12/1986 | Sperlich ............................ 370/104 |
| 4,792,963 | 12/1988 | Campanella et al. . |
| 5,432,521 | 7/1995 | Siwiak et al. ..................... 342/357 |
| 5,471,648 | 11/1995 | Gourgue ............................ 455/63 |
| 5,561,838 | 10/1996 | Chandos et al. .................. 455/13.1 |

*Primary Examiner*—Theodore M. Blum
*Attorney, Agent, or Firm*—Keith A. Chanroo

[57] ABSTRACT

A satellite communication system (100) includes a satellite (102) in a predefined orbit projecting a plurality of beams (1–48) designating a coverage area (115). The satellite (102) has a communication device (200), a frequency synthesizer (222) for setting a frequency of the communication device for communicating via a beam of the plurality of beams (1–48) and a controller (216) coupled to the frequency synthesizer (222) for compensating for a Doppler frequency shift associated with the beam.

13 Claims, 6 Drawing Sheets

METHOD FOR COMPENSATING FOR DOPPLER FREQUENCY SHIFTS FOR SATELLITE COMMUNICATION SYSTEMS

FIELD OF THE INVENTION

This invention relates in general to satellite communication systems, and more specifically to a method for compensating for Doppler frequency shifts for satellite communication systems.

BACKGROUND OF THE INVENTION

The prior art satellite systems comprise a fixed position antenna mounted on a satellite in geo-stationary orbit. Typically in such systems, the antenna is fixed so that the spot or the "footprint" of the signal beam covers a portion of the globe that is "visible" to the satellite.

The ground level strength of the signal transmitted by the antenna in these prior art systems is very weak as a consequence of the great distance to the geo-stationary orbits. This creates a problem, even for the highest powered geo-stationary satellites, since the ground level signal is too weak to allow for in-building coverage. For example, for a geo-stationary satellite with a radiated power of 400 watts, a selective call device using prior art selective call signaling protocol at a bit rate of 512 bits per second has been observed to have only 2 dB of signaling margin. That is, the average signal strength on the ground is only 2 dB above the minimum level required to activate a selective call device. Thus, considering that most buildings attenuate (radio frequency) RF signals by 20 dB (decibel), these systems could not be used to signal selective call users inside buildings.

Some satellite communication systems are in closer orbits and consequently achieve significantly higher ground level signal strengths by steering the antenna beam to cover different geographical areas in a repetitive pattern to achieve wide area coverage. These lower orbits necessarily result in significant relative velocities between an observer on the ground and the satellite resulting in a variable Doppler frequency shift and variable transmission delays which derogate receiver sensitivity making signal acquisition extremely difficult.

Thus, what is needed is a method and apparatus to minimize the Doppler frequency shifts and to equalize path delays associated with a satellite communication system.

DESCRIPTION OF A PREFERRED EMBODIMENT

Figure 1:
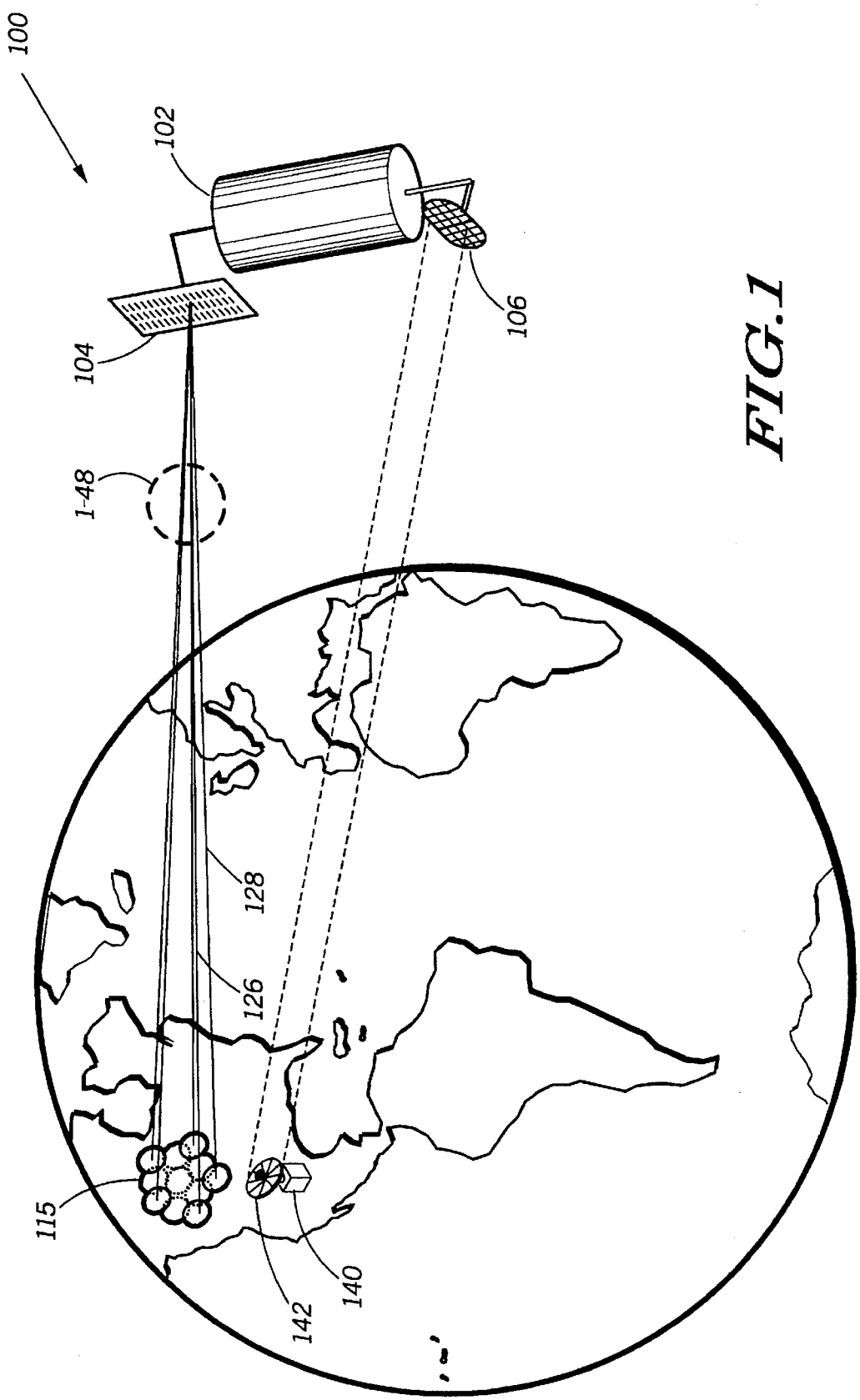
FIG. 1 is a block diagram of a satellite communication system in accordance with a preferred embodiment of the present invention.

Referring to FIG. 1, a block diagram of a satellite communication system is shown in accordance with a preferred embodiment of the present invention. The satellite communication system 100 according to a preferred embodiment of the present invention comprises a movable or steerable multi-beam antenna (antenna) 104 mounted on a satellite 102 preferably in a circular or elliptical orbit around the earth or a moon. The movement and operation of the antenna 104 is controlled by the satellite 102 for transmitting signals to, and receiving signals from, a communication device located on, for example, the earth surface.

The antenna 104 is arranged to be able to transmit or receive at least one signal beam, but according to the preferred embodiment of the invention, the antenna 104 is able to transmit or receive a number of signal beams 1–48 that have small enough beam areas designating spot areas within the coverage area 115 to be described in details below. The antenna, for illustration, is able to transmit and receive forty-eight different spots that are overlapping to designate the coverage area 115. The antenna 104 scans each of the geographical locations with the spot areas preferably in predetermined sequence and for a predetermined time. The predetermined sequence and predetermined time can be changed by a controller for improving air time efficiencies, by skipping certain spot areas that have little or no communication activities and repeating those spot areas that have a high communication activities. The techniques for implementing an electronically steerable antenna are well known in the antenna art. The satellite 102 also has a second antenna 106 that receives communication signals between an earth based station 140 and antenna 142.

Figure 2:
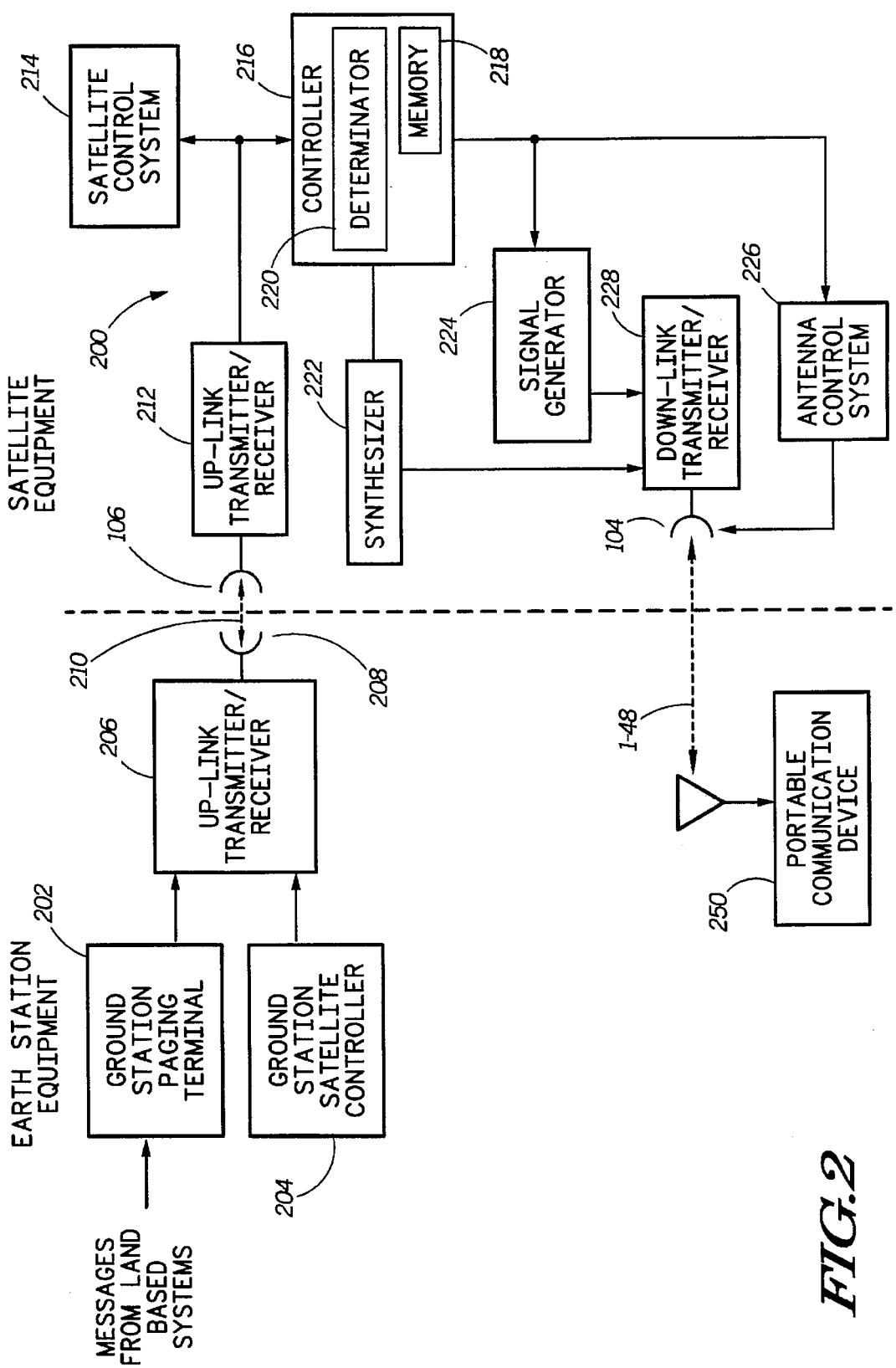
FIG. 2 is an electrical block diagram of the satellite communication system in accordance with a preferred embodiment of the present invention.

Referring to FIG. 2, communication signals from a ground based terminal 202 and control signals from a ground station satellite controller 204 are applied to an up-link transmitter/receiver 206. Up-link signals 210, comprising data signals and control signals required to control the operation of the satellite 102. The communication signals are transmitted/received from the up-link transmitter/receiver 206 to an up-link receiver/transmitter 212 of a communication device 200 of the satellite 102 via antenna 208 and antenna 106.

The communication device 200 of the satellite 102 comprises the antenna 106, the up-link receiver/transmitter 212 coupled to a satellite control system 214 and satellite controller 216. The controller 216 comprises a memory 218 for storing a plurality of Doppler compensation values, D, for minimizing the Doppler frequency shift associated with each of the plurality of beams, B, and a plurality of time delays, T, associated with the forty-eight beams, B.

The memory 216, e.g., has the following information shown in Table 1 which was determined using the well known relationships between satellite predefined orbital motions and Doppler frequency shifts as observed at a point on the earth:

TABLE 1

| Beam Number, B | Doppler Compensation values, D, kHz | Delay, T, ms |
| --- | --- | --- |
| 1, 39 | −32 | 5.8 |
| 2, 38 | −30 | 6.4 |
| 3, 37 | −27 | 7.0 |
| 4, 36 | −19 | 7.2 |
| 5, 35 | −6 | 6.6 |
| 6, 34 | 2 | 6.6 |
| 7, 33 | 9 | 5.5 |
| 8, 44 | −20 | 4.6 |
| 9, 43 | −22 | 4.6 |
| 10, 42 | −14 | 4.9 |

TABLE 1-continued

| Beam Number, B | Doppler Compensation values, D, kHz | Delay, T, ms |
|---|---|---|
| 11, 41 | −6 | 5.1 |
| 12, 40 | 6 | 4.6 |
| 13, 47 | −20 | 3.3 |
| 14, 46 | −12 | 3.5 |
| 15, 45 | 2 | 3.3 |
| 16, 48 | −4 | 2.7 |
| 17, 23 | 20 | 5.4 |
| 18, 22 | 28 | 6.4 |
| 19, 21 | 32 | 7.0 |
| 20 | 32 | 7.0 |
| 24, 28 | 24 | 4.1 |
| 25, 27 | 30 | 4.9 |
| 26 | 34 | 4.8 |
| 29, 31 | 18 | 3.3 |
| 30 | 22 | 3.3 |
| 32 | 10 | 2.7 |

The controller 216 retrieves a Doppler compensation value determined to minimized the Doppler frequency shift associated with a beam of the plurality of beams 1–48. The controller 216 provides the Doppler frequency value associated with the beam to a frequency synthesizer 222 for compensating for the Doppler frequency shift associated with the beam being utilized. The synthesizer 222 can be replaced for an oscillator or other suitable device capable of producing a frequency offset in an output signal. The Doppler compensation value causes the synthesizer 222 to shift in (or offset its) frequency by an amount relative to the Doppler frequency shift thereby minimizing the effects of the Doppler frequency shift across the plurality of beams 1–48 within the coverage area 115. The controller 216 further comprises a determinator 220 that determines when the transmitter/receiver 228 is transmitting or receiving within a particular beam. The Doppler compensation values in Table 1 shows the required compensation for receiving a signal at the satellite 102. When transmitting from the satellite 102 to a portable radio communication device 250, the determinator 220 applies the Doppler compensation value shown in Table 1, but with the opposite sign (negative value).

By way of illustration, imagine a satellite viewed by an observer on the ground as approaching the observer. Signals from the satellite to the observer appears higher than the nominal frequency due to Doppler frequency shifting, and thus must be compensated at the satellite by transmitting lower in frequency by the Doppler compensation value. A receiver on the satellite would likewise observe signals from the ground-based communication device as shifted up by the Doppler amount.

A signal generator 224 of the communication device 200 receives information and control signals from the controller 216 and transmits/receives information via the down-link transmitter/receiver 228 and antenna 104 to, for example, a portable communication device 250. The antenna 104 is directed by an antenna control system 226 coupled to satellite controller 216 to direct beams at geographic locations on the earth's surface in a predetermined sequence and for a predetermined time interval. When the beam of antenna 104 is directed at a particular location, the transmitter/receiver 228 will communicate with the portable communication device 250, for example, a selective call device or cellular telephone.

The selective call device 250 synchronizes its battery savers to the appropriate batch in the communication signals 1–48 from the satellite using the synchronization code of the appropriate signals as is well known to one of ordinary skill in the art. Once the selective call device 250 has been synchronized and addressed, it will decode the satellite communication signals carried by beams 1–48.

Figure 3:
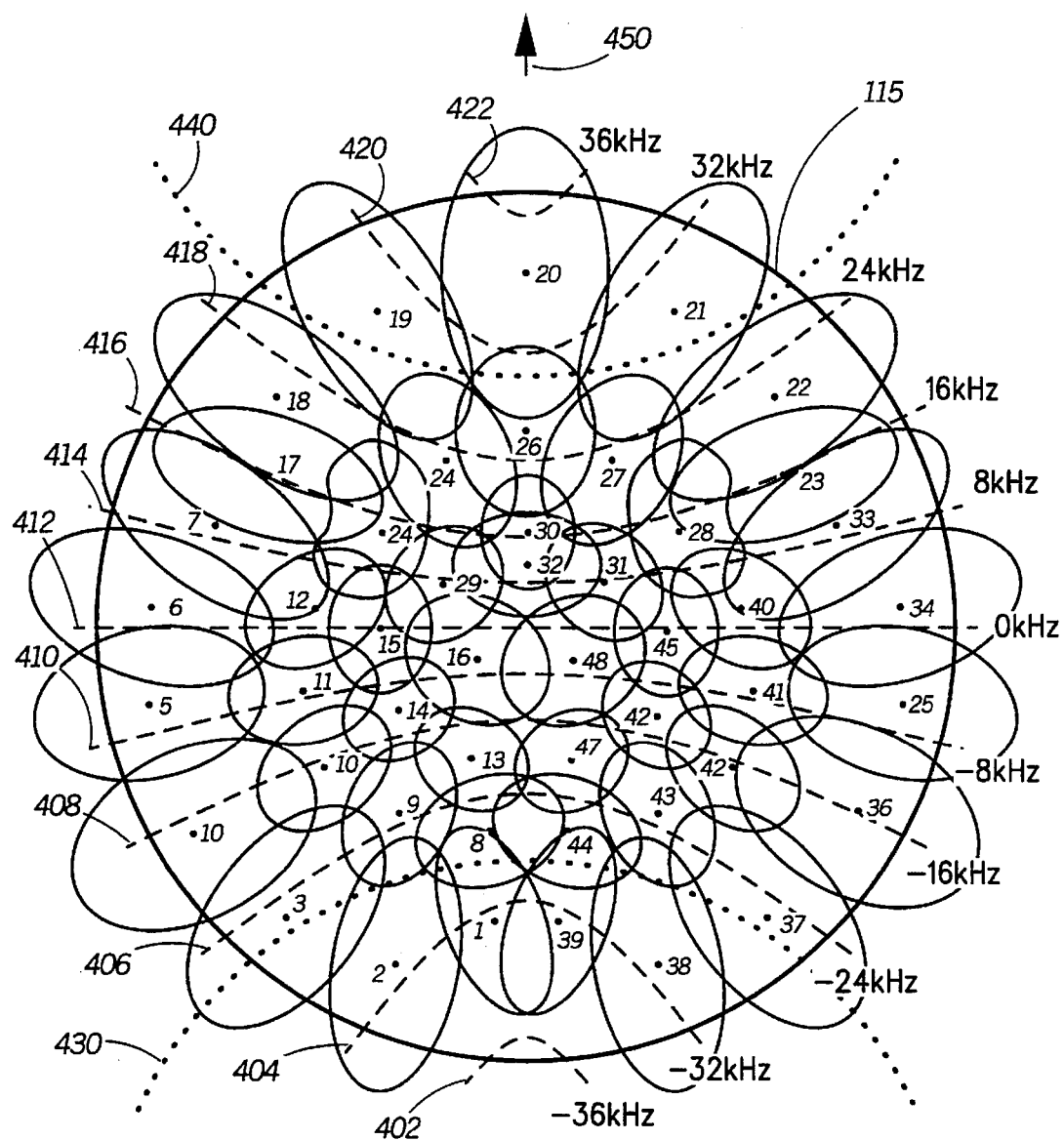
FIG. 3 illustrates the coverage area of the satellite illustrating a plurality of beams designating a plurality of footprints according to FIG. 1.

Referring to FIG. 3, the coverage area 115 of the satellite is shown illustrating the forty-eight spot beams 1–48. As discussed above, the antenna 104 sequentially scans through the forty-eight beams and generates a communication signal in at least one of the beams. The multiple user access and scanning techniques include one or more of the following techniques: Time Division Multiple Access (TDMA), Frequency Division Multiple Access (FDMA), or Code Division Multiple Access (CDMA) well known to one of ordinary skill in the art. In all cases, any of the subset of the of the multiple beams might be used simultaneously according to the traffic demands of the satellite communication system. The Doppler frequency shift contours are illustrated by the contour lines 402–422 depicting the actual Doppler frequency shift associated with each contour. The dotted line 430 depicts an overlap between the present satellite and a next satellite, and the dotted line 440 depicts the overlap region between a previous satellite and the current satellite in a multiple satellite communication system.

In the IRIDIUM™ satellite system, for illustration, each satellite projects a plurality of beams with its geographic coverage area 115 or footprint as shown. In this example, the satellites operates near 1640 MHz, and are in a circular orbit of approximately 780 km above the earth in nearly polar orbits. In polar orbits, the satellite orbits include the north and south poles. There are approximately six orbital planes, each orbit having eleven satellites to provide ubiquitous communication across the globe.

The Doppler frequency shift contours 402–422 are as observed by a stationary receiver on the ground or by a receiver on the satellite. As shown, each beam spans only a fraction of the total possible Doppler frequency shift of between 36 kHz and −36 kHz. For example, a leading beam 20 covers Doppler frequency shifts between about 26 to 36 kHz. Beam 32 covers Doppler frequency shifts of −1 to 12 kHz. Generally, it can be seen that all the beams cover no more than about 16 kHz, the receivers and transmitters on the satellite can be pre-compensated to within approximately +8 kHz and −8 kHz of the nominal frequency depending on the projection on the earth of the particular beam. This results in a factor of 4.5 less that the +36 to −36 kHz Doppler frequency shift as illustrated in this example.

The velocity vector of the satellites are indicated by the directional arrow 450. Therefore, for example beams 19, 26, 21 and 20 are leading beams and beam 2, 1, 39 and 38 are trailing beams with respect to the satellite nadir point. The coverage area 115 is made of multiple beams that provide a spot area in a constant geometry with respect to the direction 450 of the orbital motion. The Doppler frequency shifts are compensated with regard to the motion of the satellite and the location of the spot area. Beam 32 is nearly nadir beam and exhibits little Doppler shift when viewed from the ground. Beams 18, 19, 20, 21 and 22 are leading beams and Beams 2, 3, 38 and 37 are trailing beams all exhibiting maximum Doppler frequency shift when viewed from the ground although the sense of the Doppler frequency shift is reverse between the leading and the trailing beams. Sense is again reversed between transmitting and receiving as explained above. Therefore, each beam has a specific geometrical relationship with respect to earth. Signals on Beams 2, 3, 38 and 37 would be transmitted high and on beams 18, 19, 20, 21 and 22 would be transmitted low while the nadir beam would have minimum compensation. In summary, the satellite must transmit high/receive low by the required Doppler compensation value for all beams that are trailing or receding (behind the nadir) and transmit low/receive high by the required Doppler compensation value in all beams approaching or leading (beams forward of the nadir). Therefore, the Doppler frequency shift will be reduced to ±8 kHz as opposed to the ±36 kHz Doppler frequency across the coverage area of the plurality of beams.

For illustration, in the IRIDIUM™ satellite system, it is desired that the receiver sensitivity should not be significantly affected by the Doppler frequency shift otherwise the receiver sensitivity margin will degrade beyond a level suitable for signal acquisition. Since path margin is directly related to system user capacity and hence system cost, it is important to improve receiver sensitivity.

In a circular-orbit multiple-beam satellite system, each beam has a different propagation delay because of the projection on the earth's surface. Referring to Table 1, the propagation delays are shown for each of the forty-eight beams with maximum delay of 7.2 ms to a minimum of 2.7 ms. Therefore, when it is necessary to equalize the propagation delays, the controller 216 equalize the path delays by adding a delay to communication signals equal to the maximum delay of Table 1, 7.2 ms, minus the actual path delay of the current beam.

Figure 4:
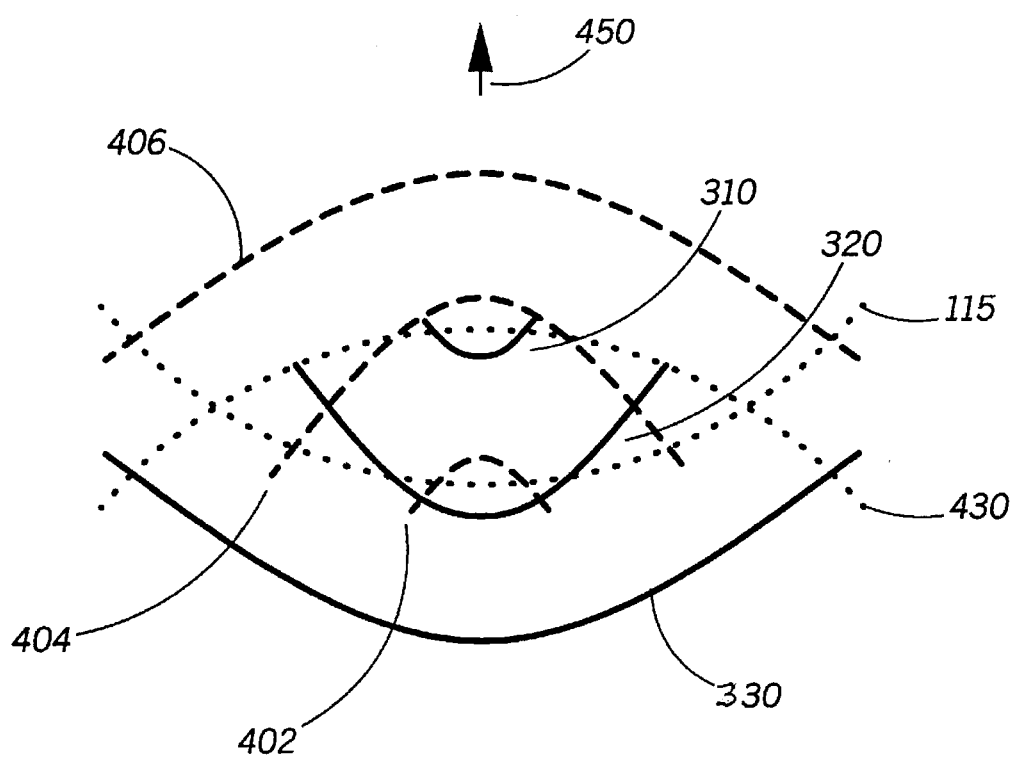
FIG. 4 illustrates the overlapping coverage areas between adjacent satellites in the similar orbits.

FIG. 4 illustrates the overlap in coverage between two satellites in a satellite communication system. A portion of coverage area contour 115 of one satellite, shown earlier in FIG. 3 in detail, overlaps a portion 430 of the coverage area contour of a second satellite. The Doppler contours 402, 404, 406 corresponding to Doppler shifts −36 kHz, −32 kHz, −24 kHz of the first satellite overlap the Doppler contours 310, 320, 330 corresponding to Doppler shifts +36 kHz, +32 kHz, +24 kHz of the second satellite in a satellite communication system. Without Doppler compensation, the ground based communication device would need to adjust from a maximum negative Doppler shift in the −36 kHz range to a maximum positive Doppler shift in the +36 kHz range, a total adjustment of 72 kHz. As explained above, Doppler compensation reduces the total adjustment to less than 16 kHz.

Figure 5:
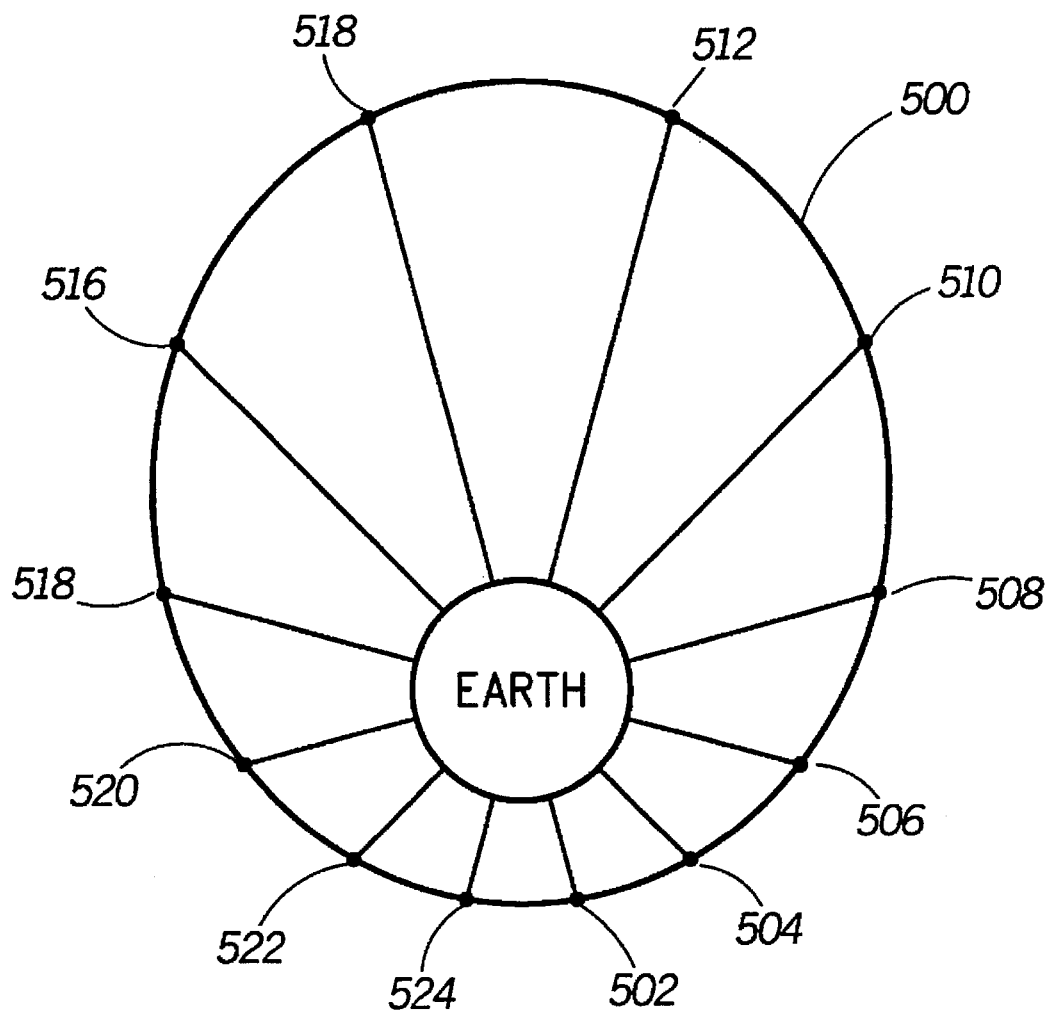
FIG. 5 illustrate a satellite in an elliptical orbit according to a second embodiment of the present invention.

Referring to FIG. 5, an elliptical or non-circular orbit satellite which can have a single beam is shown. During the elliptical orbit 500, the satellite single beam is projected on the earth surface at varying angles and varying distances as shown at a plurality of predetermined points 502–524. The Doppler frequency shifts and the propagation delays are calculated for the predetermined points 502–524 and the controller 216 is able to compensate for the Doppler frequency shifts and propagation delays similar to a multibeam satellite system having a circular orbit.

Figure 6:
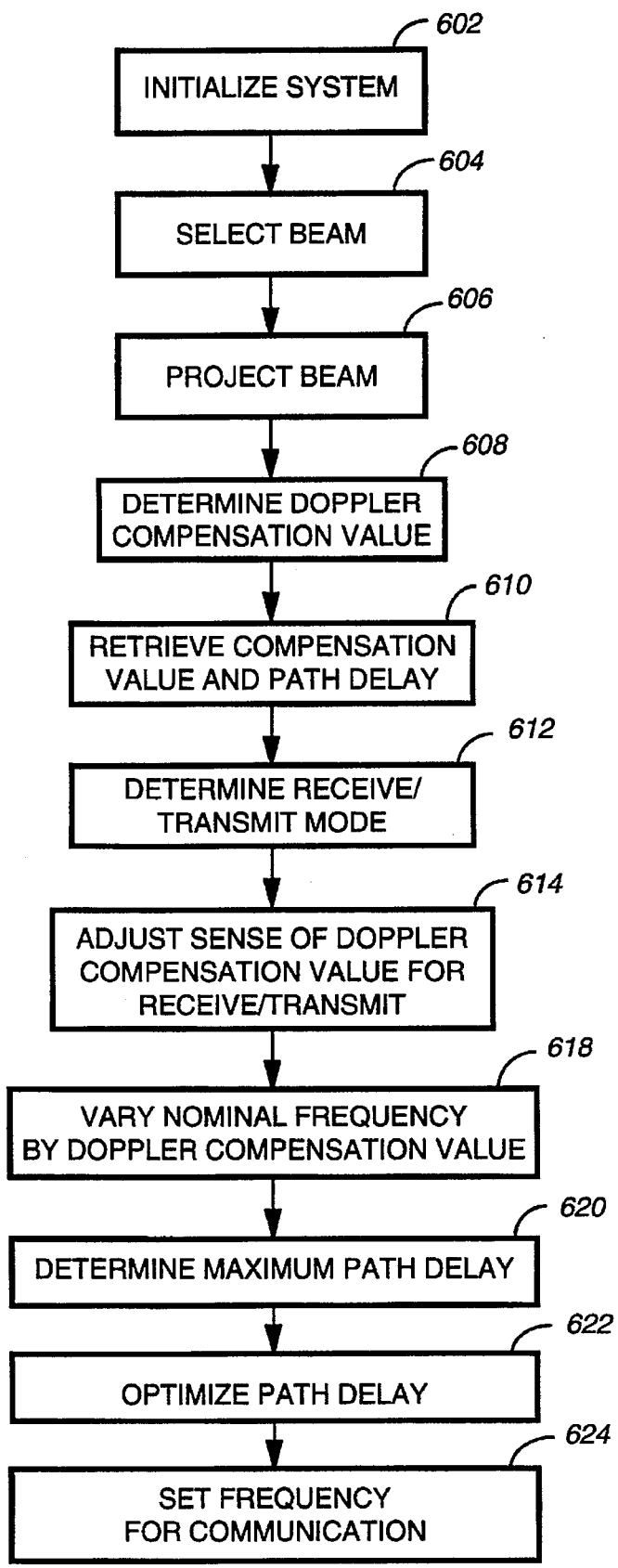
FIG. 6 is flow diagram illustrating a method for compensation for Doppler frequency shifts in accordance with the preferred embodiment of the present invention.

FIG. 6 is a flow diagram illustrating a method for compensation for Doppler frequency shifts in accordance with the preferred embodiment of the present invention. The system is initialized, step 602, the beam is selected, step 604, and the beam is projected into the coverage area, step 606. The Doppler compensation value is determined, step 608, and the appropriate Doppler compensation value is retrieved from memory along with the path delay associated with the current beam, step 610. The determinor determines if the satellite is in the receive or transmit mode, step 612, and the sense of the Doppler compensation value is adjusted for receive and transmit mode, step 614. The nominal frequency is selected, and varied by the Doppler compensation value, 618. The maximum path delay is determined, step 620 and the delay is optimized, set 622 as discussed above. The frequency is precompensated frequency is set for enabling communication with the satellite with minimal Doppler frequency shift. In summary, in a satellite communication system, a method for minimizing Doppler frequency shifts comprising the steps of: projecting at least one of a plurality of beams for designating a coverage area; scanning through the plurality of beams for setting a frequency for communicating of the plurality of beams; and varying the frequency for compensating for a Doppler frequency shift associated with a beam. The step of varying further comprising the steps of: storing a plurality of Doppler compensation values predetermined for minimizing the Doppler frequency shift associated with each of the plurality of beams; retrieving a Doppler compensation value associated with a beam of the plurality of beams; determining when the Doppler compensation value is associated with a signal being transmitted; converting the Doppler compensation value to a negative value for minimizing the Doppler frequency shift associated with the beam; calculating path delays associated with each of the plurality of beams; determining a maximum path delay; and equalizing a path delay by applying a delay equal to the sum of the maximum path delay minus the path delay associated with a current beam.

I claim:

1. A satellite communication system, comprising:
   at least one satellite in a predefined elliptical orbit projecting a beam designating a coverage area, the at least one satellite, comprising:
      a radio communication device;
      a frequency synthesizer for setting a frequency of the radio communication device; and
      a controller, coupled to the frequency synthesizer, for compensating for a Doppler frequency shift associated with the beam, wherein the controller generates a plurality of Doppler compensation values at a plurality of predetermined points that are time dependent on the elliptical orbit and
   wherein the controller calculates path delays associated with the plurality of predetermined points;
      a determinator determines a maximum path delay; and
      the controller applies an equalizing delay equal to a path delay summing the path delay with a result of the maximum path delay minus the path delay associated with a current predetermined point.

2. The satellite communication system according claim 1 the controller further comprising:
   a memory for storing a plurality of Doppler compensation values for minimizing Doppler frequency shifts at a plurality of predetermined points; and
   wherein the controller retrieves a Doppler compensation value determined to minimized the Doppler frequency shift at a predetermined point.

3. The satellite communication system according to claim 2 wherein the controller associates the Doppler compensation value with a receiver and converts the Doppler compensation value to its negative value in response to determining that the Doppler frequency shift is associated with a transmitter of the radio communication device.

4. The satellite communication system according to claim 1 wherein the controller retrieves Doppler compensation values along the non-symmetrical elliptical orbit at the plurality of predetermined points.

5. A satellite communication system comprising:
   a satellite in a predefined orbit projecting a plurality of beams designating a coverage area, the satellite comprising:
      a communication device;

a frequency synthesizer for setting a frequency of the communication device for communicating via a beam of the plurality of beams; and a controller, coupled to the frequency synthesizer, for compensating for a Doppler frequency shift associated with the beam, wherein:

the controller determines path delays associated with each of the plurality of beams;

a determinator determines a maximum path delay; and the controller equalizes a path delay by summing the path delay with a result of the maximum path delay minus the path delay associated with a current beam.

6. The satellite communication system according claim 5 wherein the controller further comprising:

a memory for storing a plurality of Doppler compensation values for minimizing the Doppler frequency shift associated with each of the plurality of beams; and wherein the controller retrieves a Doppler compensation value determined to minimized the Doppler frequency shift associated with a beam of the plurality of beams.

7. The satellite communication system according to claim 6 wherein controller further comprises:

a determinator for determining when the Doppler compensation value is associated transmitter or receiver; and the controller, in response to the determinator, provides a negative Doppler compensation value for minimizing the Doppler frequency shift associated with the transmitter.

8. In a satellite communication system, a method for minimizing Doppler frequency shifts associated with a satellite in a predefined orbit, comprising the steps of:

projecting a plurality of beams for designating a coverage area;

setting a frequency for communicating via a beam of the plurality of beams;

varying the frequency for compensating for a Doppler frequency shift associated with the beam wherein the step of varying further comprising the steps of:
calculating path delays associated with each of the plurality of beams;
determining a maximum path delay; and
equalizing a path delay by applying a delay equal to a sum of the maximum path delay minus the path delay associated with a current beam.

9. The method according claim 8 wherein the step of varying further comprising the steps of:

storing a plurality of Doppler compensation values predetermined for minimizing the Doppler frequency shift associated with each of the plurality of beams; and
retrieving a Doppler compensation value associated with a beam of the plurality of beams.

10. The method according to claim 9 wherein the step of varying further comprising the steps of:

determining when the Doppler compensation value is associated with a signal being transmitted; and
converting the Doppler compensation value to a negative value for minimizing the Doppler frequency shift associated with the beam.

11. The method according to claim 9 further comprising a step of scanning through the plurality of beams for establishing communication with another communication device.

12. The method according to claim 11 wherein the step of scanning further comprising a step of changing a scanning sequence in response to an at least one previous step of scanning.

13. In a satellite communication system, a method for minimizing Doppler frequency shifts comprising the steps of:

projecting a plurality of beams for designating a coverage area;

scanning through the plurality of beams for setting a frequency for communicating on one of the plurality of beams;

varying the frequency for compensating for a Doppler frequency shift associated with a beam, the step of varying further comprising the steps of:
storing a plurality of Doppler compensation values predetermined for minimizing the Doppler frequency shift associated with each of the plurality of beams;
retrieving a Doppler compensation value associated with a beam of the plurality of beams;
determining when the Doppler compensation value is associated with a signal being transmitted;
converting the Doppler compensation value to a negative value for minimizing the Doppler frequency shift associated with the beam;
calculating path delays associated with each of the plurality of beams;
determining a maximum path delay; and
equalizing a path delay by applying a delay to a sum of the maximum path delay minus the path delay associated with a current beam.

\* \* \* \* \*